Patented Feb. 14, 1928.

1,658,914

UNITED STATES PATENT OFFICE.

FRED W. BARHOFF, OF HARTFORD, AND WILLIAM C. BROOKS, OF MERIDEN, CONNECTICUT, ASSIGNORS TO THE HARTFORD BATTERY MANUFACTURING COMPANY, OF SOUTHINGTON, CONNECTICUT, A CORPORATION OF CONNECTICUT.

SALT FOR ELECTROLYTIC RECTIFIERS.

No Drawing.    Application filed May 26, 1927. Serial No. 194,524.

This invention relates to those salts which form the active agents of the electrolytes of current rectifiers and electrolytic condensers, particularly such devices as employ tantalum or silite electrodes as the valve metals.

The object of the invention is the production of a chemical salt, with an acid content, in a solid state but which is readily soluble in water, and is especially efficient for use in connection with rectifiers and condensers of the tantalum-lead or silite-lead electrode type, whereby the handling and transportation of electrolytes for such devices is facilitated and the cost reduced.

This object is attained by combining sulphuric acid with certain metallic salts and the radical ammonium, and reducing the resultant to a solid state, either in the form of blocks, rods, crystals, or powder, which may be shipped dry, and when desired for use merely dissolved in water to provide the required electrolyte.

The salt which forms the subject of this invention being dry, is much less in weight and bulk than the commonly used liquid acid electrolyte, with a consequent reduction in storage space, freight, cartage and handling charges, and being in a solid rather than a liquid state, all danger of leakage and destructive acid corrosion is eliminated, a condition which permits the salt electrolytic agent and complete rectifiers or electrolytic condensers, to be shipped through the mails or by other transport agency, in ordinary packages, ready for use upon the mere addition of water for dissolving the salt.

One manner of attaining the desired end is to combine, approximately, 100 grams ammonium sulphate, 40 grams sulphuric acid, and 6 grams of double valent metal, as ferrous or manganous sulphate. These ingredients are mixed thoroughly and allowed to cool and solidify into crystalline masses. This product is then preferably ground or pulverized, the final result being a dry mixture of normal ammonium sulphate and acid ammonium sulphate, with a slight content of double valent metal, that is readily soluble in water, and when so liquefied produces an electrolyte which used in a rectifier or electrolytic condenser having a tantalum electrode, is particularly efficient and is not destructive of the tantalum element, in that it appears to act uniformly over the entire surface of the tantalum rather than having a predominant action in spots or at the edges of the electrode, as does the acid electrolyte now commonly used.

Another method that may be employed is to mix and boil in water approximately, ammonium sulphate, 100 parts, sulphuric acid, up to 74 parts, and iron sulphate, or equivalent double valent metallic sulphate, 6 parts, until excess water is eliminated. This product may be cast in molds to form blocks or sticks, or allowed to crystallize, and it may be left for transportation in the block or stick form, or if quick solution is desired it may be ground or pulverized.

It is common practice, in order to prevent rapid evaporation and to eliminate danger of explosion, to place oil on top of the electrolyte of chargers and electrolytic condensers. For this purpose a small amount of oil, may be mixed with the dry salt described herein. When water is added to dissolve the salt, the oil is liberated and floats to the surface, forming the desired seal.

It has been found that the salt above described regulates the charging rate better than the commonly used liquid sulphuric acid solution, and does not increase the charging rate to a dangerous point upon concentration of the solution resulting from evaporation, as occurs with the liquid sulphuric acid solution electrolyte at present used.

The invention claimed is:—

1. A dry salt, needing only the addition of water to form a complete electrolyte for current rectifiers and electrolytic condensers having tantalum or similar filming metal electrodes, which salt is chiefly composed of ammonium bi-sulphate.

2. A dry salt, needing only the addition of water to form a complete electrolyte for current rectifiers and electrolytic condensers having tantalum or similar filming metal electrodes, which salt is composed of ammonium bi-sulphate and a small amount of double valent metal.

3. A dry salt, needing only the addition of water to form a complete electrolyte for current rectifiers and electrolytic condensers having tantalum or similar filming metal electrodes, which salt is composed of ammonium bi-sulphate and a small percentage of double valent metal, and having a small quantity of oil mixed therein.

4. A dry salt, needing only the addition of water to form a complete electrolyte for current rectifiers and electrolytic condensers having tantalum or similar filming metal electrodes, composed of the radical ammonium, sulphuric acid and metallic salts.

5. A dry salt, needing only the addition of water to form a complete electrolyte for current rectifiers and electrolytic condensers, composed of ammonium sulphate, sulphuric acid and ferrous sulphate.

6. A dry salt, needing only the addition of water to form a complete electrolyte for current rectifiers of the tantalum-lead-sulphuric-acid type, composed of ammonium sulphate, sulphuric acid and sulphate of a double valent metal.

FRED W. BARHOFF.
WILLIAM C. BROOKS.